United States Patent
Kar et al.

(10) Patent No.: US 8,996,587 B2
(45) Date of Patent: Mar. 31, 2015

(54) METHOD AND APPARATUS FOR AUTOMATICALLY STRUCTURING FREE FORM HETERGENEOUS DATA

(75) Inventors: Gautam Kar, Yorktown Heights, NY (US); Ruchi Mahindru, Yonkers, NY (US); Anca Sailer, Scarsdale, NY (US); Xing Wei, Amherst, MA (US)

(73) Assignee: International Business Machines Corporation, Armonk, NY (US)

( * ) Notice: Subject to any disclaimer, the term of this patent is extended or adjusted under 35 U.S.C. 154(b) by 2116 days.

(21) Appl. No.: 11/675,392

(22) Filed: Feb. 15, 2007

(65) Prior Publication Data

US 2008/0201279 A1 Aug. 21, 2008

(51) Int. Cl.
- *G06F 17/30* (2006.01)
- *G06Q 30/02* (2012.01)
- *G06F 17/27* (2006.01)

(52) U.S. Cl.
CPC ............ *G06Q 30/02* (2013.01); *G06F 17/2705* (2013.01); *G06F 17/277* (2013.01)
USPC ........... 707/802; 707/747; 707/811; 715/231; 704/9

(58) Field of Classification Search
USPC ............ 705/1, 7, 1.1; 707/101, 102, 104.1, 5, 707/100, 791, 796, 802, 803, 811, 999.101, 707/602, 603, 747; 714/46, 57, 699, 701; 706/12, 45, 13; 704/9, 4, 5, 6; 715/230, 715/231, 234
See application file for complete search history.

(56) References Cited

U.S. PATENT DOCUMENTS

| | | | |
|---|---|---|---|
| 5,671,436 A | | 9/1997 | Morris et al. |
| 6,212,494 B1 | * | 4/2001 | Boguraev .......................... 704/9 |
| 6,542,518 B1 | | 4/2003 | Miyazawa |
| 6,829,734 B1 | | 12/2004 | Kreulen et al. |
| 6,892,193 B2 | | 5/2005 | Bolle et al. |
| 7,106,903 B2 | | 9/2006 | Chang et al. |
| 7,117,231 B2 | * | 10/2006 | Fischer et al. .......................... 1/1 |
| 7,415,509 B1 | | 8/2008 | Kaltenmark et al. |
| 7,490,085 B2 | * | 2/2009 | Walker et al. .................... 707/10 |
| 7,720,214 B2 | | 5/2010 | Ricketts |
| 8,108,413 B2 | | 1/2012 | Kar et al. |
| 2003/0154181 A1 | | 8/2003 | Liu et al. |
| 2003/0167163 A1 | | 9/2003 | Glover et al. |
| 2003/0212654 A1 | * | 11/2003 | Harper et al. ...................... 707/1 |

(Continued)

OTHER PUBLICATIONS

S. Spangler et al., "Knowledge Base Maintenance Using Knowledge Gap Analysis," Procs. of the 7th ACM SIGKDD International Conference on Knowledge Discovery and Data Mining, 2001, pp. 462-466, California.

(Continued)

*Primary Examiner* — Greta Robinson
(74) *Attorney, Agent, or Firm* — Anne V. Dougherty; Ryan, Mason & Lewis, LLP

(57) ABSTRACT

Techniques are provided for automatically structuring free form heterogeneous data. In one aspect of the invention, the techniques include obtaining free form heterogeneous data, segmenting the free form heterogeneous data into one or more units, automatically labeling the one or more units based on one or more machine learning techniques, wherein each unit is associated with a label indicating an information type, and structuring the one or more labeled units in a format to facilitate one or more operations that use at least a portion of the labeled units, e.g., information technology (IT) operations.

14 Claims, 4 Drawing Sheets

(56) References Cited

U.S. PATENT DOCUMENTS

| | | | |
|---|---|---|---|
| 2003/0226100 | A1 | 12/2003 | Farahat et al. |
| 2004/0049498 | A1 | 3/2004 | Dehlinger et al. |
| 2004/0193401 | A1 | 9/2004 | Ringger et al. |
| 2005/0027664 | A1* | 2/2005 | Johnson et al. ............... 706/12 |
| 2005/0108256 | A1 | 5/2005 | Wakefield et al. |
| 2005/0198563 | A1 | 9/2005 | Kristjansson |
| 2006/0026203 | A1 | 2/2006 | Tan et al. |
| 2006/0143175 | A1 | 6/2006 | Ukrainczyk et al. |
| 2006/0179016 | A1 | 8/2006 | Forman et al. |
| 2006/0222239 | A1 | 10/2006 | Bargeron et al. |
| 2006/0245641 | A1* | 11/2006 | Viola et al. ............... 382/155 |
| 2006/0245654 | A1 | 11/2006 | Viola et al. |
| 2006/0255124 | A1 | 11/2006 | Hoch et al. |
| 2006/0277028 | A1 | 12/2006 | Chen et al. |
| 2006/0294094 | A1 | 12/2006 | King et al. |
| 2007/0005341 | A1* | 1/2007 | Burges et al. ............... 704/9 |
| 2007/0143101 | A1 | 6/2007 | Goutte |
| 2007/0219776 | A1* | 9/2007 | Gamon et al. ............... 704/9 |
| 2008/0005136 | A1* | 1/2008 | Kano ............... 707/100 |
| 2008/0120129 | A1* | 5/2008 | Seubert et al. ............... 705/1 |
| 2008/0201130 | A1* | 8/2008 | Peters et al. ............... 704/9 |
| 2008/0201131 | A1 | 8/2008 | Kar et al. |

OTHER PUBLICATIONS

J. Lafferty et al.., "Conditional Random Fields: Probabilistic Models for Segmenting and Labeling Sequence Data," Procs. of the 18th International Conference on Machine Learning, 2001, pp. 282-289.

U.S. Appl. No. 11/675,396 filed in the name of G. Kar et al. on Feb. 15, 2007 and entitled "Method and Apparatus for Automatically Discovering Features in Free Form Heterogeneous Data."

Search Report for PCT/EP2008/051726 dated Jun. 6, 2008.

T. Li et al., "An Integrated Framework on Mining Logs Files for Computing System Management," Procs. of the 11th ACM SIGKDD International Conference on Knowledge Discovery in Data Mining, Aug. 2005, pp. 776-781, Illinois.

C.M. Lee et al., "Combining Acoustic and Language Information for Emotion Recognition," 7th International Conference on Spoken Language Processing, ICSLP, 2002, 4 pages, Colorado.

D. Padmanabhan et al., "Mining Conversational Text for Procedures," Proc. of the IJCAI Workshop on Analytics for Noisy Unstructured Text Data, 2007, pp. 163-170.

W. Li et al., "Semi-Supervised Sequence Modeling with Syntactic Topic Models," AAAI, 2005, pp. 813-818.

D. Pinto et al., "Table Extraction Using Conditional Random Fields," Procs. of SIGIR, 2003, pp. 235-242, Canada.

S.Spangler et al., "Interactive Methods for Taxonomy Editing and Validation," Next Generation of Data-Mining Applications, 2005, pp. 495-552.

S. Kullback et al., "On Information and Sufficiency," The Annals of Mathematical Statistics, Mar. 1951.

S.M. Weiss et al., "Automated Generation of Model Cases for Help-Desk Application", IBM Systems Journal, 2002, pp. 421-427, vol. 41, No. 3.

\* cited by examiner

METHOD AND APPARATUS FOR AUTOMATICALLY STRUCTURING FREE FORM HETERGENEOUS DATA

CROSS-REFERENCE TO RELATED APPLICATIONS

The present application is related to U.S. patent application identified as Ser. No. 11/675,396, filed concurrently herewith, and entitled "Method and Apparatus for Automatically Discovering Features in Free Form Heterogeneous Data," the disclosure of which is incorporated by reference herein.

FIELD OF THE INVENTION

The present invention generally relates to data processing, and, more particularly, to a method and apparatus for automatically structuring free form heterogeneous data.

BACKGROUND OF THE INVENTION

Systems that facilitate remote technical assistance are an integral part of overall information technology (IT) product sales, deployment, and maintenance life cycle. Such systems are used, for example, by technical employees, business partners, and vendors to help solve the problems that customers have with hardware and software products. Typically, the technical helpdesk party receives, from the customer, an electronic mail (e-mail) or a telephone call describing the issue that needs to be fixed. The technical helpdesk party records, in free form text, the initial e-mail and subsequent e-mail exchanges on that issue, as well as any other information that the party considers relevant to describing or solving the issue.

The technical helpdesk party records this information by using specific trouble ticket (TT) management tools. These tools help in the tracking of individual tickets. Thus, when a technical helpdesk party needs to solve a problem, they can first check to see if the problem has been reported for another customer. If it has, the party can read how to fix the problem and avoid spending time trying to solve problems that other technical helpdesk parties have already solved.

However, searching in a collection of free form documents for a particular topic can be difficult and error prone. For example, one could try to find potential resolutions for fixing "Websphere AS version 5.1 on Windows," and retrieve an overwhelmingly large amount of irrelevant tickets just because the tickets contain "Websphere version 6 has been upgraded from Websphere AS version 5.1" in their text. Alternatively, a party may retrieve an entry stating, for example, "try the ticket queue for Websphere AS version 5.1 on Linux, because here you are on Websphere AS version 5.1 on Windows queue."

Existing approaches include a knowledge discovery approach to problem ticket data. For example, U.S. Pat. No. 6,829,734 entitled "Method for discovering problem resolutions in a free form computer helpdesk data set" includes a method and structure for discovering problem resolution in a helpdesk data set of problem tickets based on using an enumerated set of phrases that have been identified as indicating diagnosis, instruction, or corrective action. Disadvantages of the existing approaches include the use of helpdesk ticketing data consisting of short text descriptions of telephone calls with customers, and as such, many, if not most, of the problem tickets provide little or no problem resolution information. Existing approaches identify tickets by matching their content to specific words or words combinations (indicative of problem diagnosis and resolution) through word-/phrase-based heuristic rules that have been manually generated by specialist inspection of the TT.

Existing approaches primarily focus on classical data mining techniques, such as, for example, clustering based on frequency of words and discovery based on keywords in the semi-structured data. However, most of the existing ticketing data is unstructured, highly noisy, and very heterogeneous in content (that is, natural language, system generated data, domain specific terminology, etc.), making it difficult to effectively apply common data mining techniques used in the existing approaches to analyze the raw ticketing data.

It would thus be desirable to overcome the limitations in previous free form data structuring approaches.

SUMMARY OF THE INVENTION

Principles of the present invention provide techniques for automatically structuring free form heterogeneous data.

For example, in one aspect of the invention, a technique for automatically structuring free form heterogeneous data includes the following steps. Free form heterogeneous data is obtained. The free form heterogeneous data is segmented into one or more units. The one or more units are automatically labeled based on one or more machine learning techniques, wherein each unit is associated with a label indicating an information type. Also, the one or more labeled units are structured in a format to facilitate one or more operations that use at least a portion of the labeled units, e.g., IT operations.

In another aspect of the invention, a technique for automatically structuring free form problem ticket data for facilitating technical assistance for IT operations includes the following steps. Free form problem ticket data is obtained. The data is segmented, and the segmented data is stored in a database. A portion of the segmented data is manually labeled, and the labeled data is used to generate an annotation model. The annotation model is used to automatically label a portion of unlabeled segmented data. The automatically labeled data is stored in the database. Also, the stored data is structured in a format, wherein the format facilitates technical assistance for one or more IT operations.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

At least one embodiment of the invention may provide one or more beneficial technical effects, such as, for example, precise acquisition of information from a problem ticket. Also, at least one embodiment of the invention may provide the beneficial effect of effectively structuring a wide range of complex interleaved unit data types and text dependencies.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
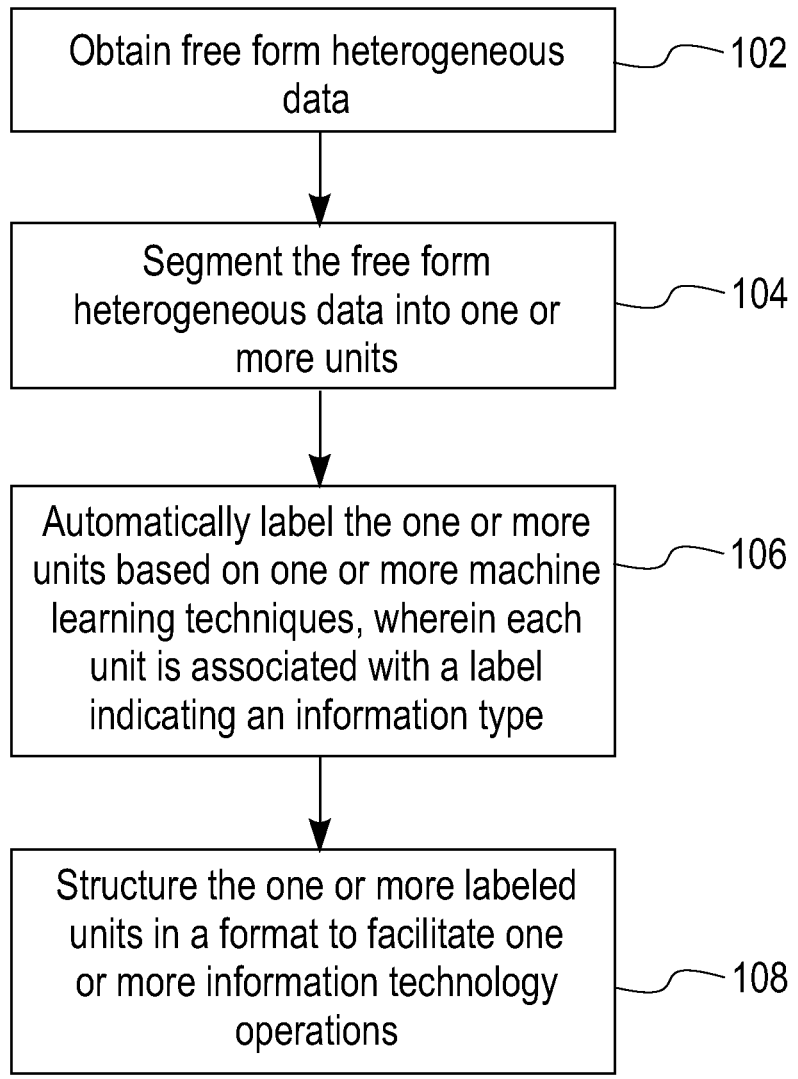
FIG. 1 is a flow diagram illustrating a method for automatically structuring free form heterogeneous data, according to one embodiment of the invention.

Principles of the present invention include techniques to automatically structure free form heterogeneous textual data in order to enable an enhanced search system. The techniques include identifying specific features of patterns discovered in the free form text through machine learning procedures. As used herein, "free form data" refers to data that does not reside in fixed locations. By way of example, free form data may include unstructured text in a word processing document. Also, as used herein, "trouble ticket (TT)" as well as "problem ticket" refer to a mechanism used to track the detection, reporting, and resolution of some type of problem.

Principles of the present invention identify the structure of free form textual data rich in various descriptions, steps, analysis, interleaved with data identification details and content that is not useful for search purpose (for example, separators). Therefore, one or more embodiments of the present invention facilitate searching systems that distinguish the relevant parts of free form textual data from the irrelevant portions for various purposes and objectives. Principles of the present invention provide an approach for automatically identifying key information structures in a free form textual problem ticket.

An exemplary embodiment of the present invention utilizes a set of supervised and semi-supervised learning algorithms and processes to carry out the techniques described below. Free text is segmented into one or more units by identifying the punctuation, one or more line breaks in the free form data, or by identifying parts of speech in the data, particularly the verbs. The segmenting step transforms the free text into a format that can be labeled, and determines the text format that will ultimately be provided to the one or more users. The segmented units are automatically labeled based on machine learning techniques, so that each unit of the free form data is associated with one label that indicates the information type of the unit. The labeling step annotates the data and makes it possible to impose structure on the free form TT data.

Once the structure of a TT set has been identified through manual/automatic analysis of the data and imposed through automatic labeling, the TT set can be represented by a format such as, for example, a table, an extensible markup language (XML) format, or other structured formats. The structured data format can be used, for example, to facilitate search and analysis operations that cannot be performed effectively on the initial free form data. The structured data can also be used, for example, to provide a better understanding of the contents in a ticket to human beings, as well as to provide a more effective representation to computers. An example of such an analysis is the detection of individual, concrete steps taken by individuals (for example, technical employees) to resolve a particular customer issue. As noted above, in existing approaches, similar analysis steps would be buried in the free form text of a ticket and could not, in general, be reused easily.

Furthermore, in contrast to the disadvantages of existing approaches, principles of the present invention provide automated and generic techniques to generate feature-based complex models (that is, models that make use of one or more feature sets) to identify the relevant structures of the TT. An exemplary embodiment of the present invention provides precise acquisition of information from each ticket, including, for example, differentiation of problem description from root cause analysis, resolution steps, etc. Also, a preferred embodiment of the invention is capable of being used with complex data. A learning process is generated by a machine learning model and thus, can effectively function with a wide range of complex interleaved unit data types and text dependencies. As noted above, existing approaches utilize rule-based heuristic methods, and are effective only on data with dominating and obvious features.

Principles of the present invention are based on common automatic learning, and therefore it is to be appreciated by one skilled in the art that they are applicable to data sets other than those described in the specific implementations herein. For example, most of the basic features discovered during the evaluation of a particular data set can be inherited, and new features can be easily added.

FIG. 1 shows a flow diagram illustrating a method for automatically structuring free form heterogeneous data, according to one embodiment of the invention. Step 102 includes obtaining free form heterogeneous data. Step 104 includes segmenting the free form heterogeneous data into one or more units. Step 106 includes automatically labeling the one or more units based on one or more machine learning techniques, wherein each unit is associated with a label indicating an information type. Step 108 includes structuring the one or more labeled units in a format to facilitate one or more IT operations. Structuring the one or more labeled units in a format may include facilitating processing of existing free form data and newly obtained free form data.

Figure 2:
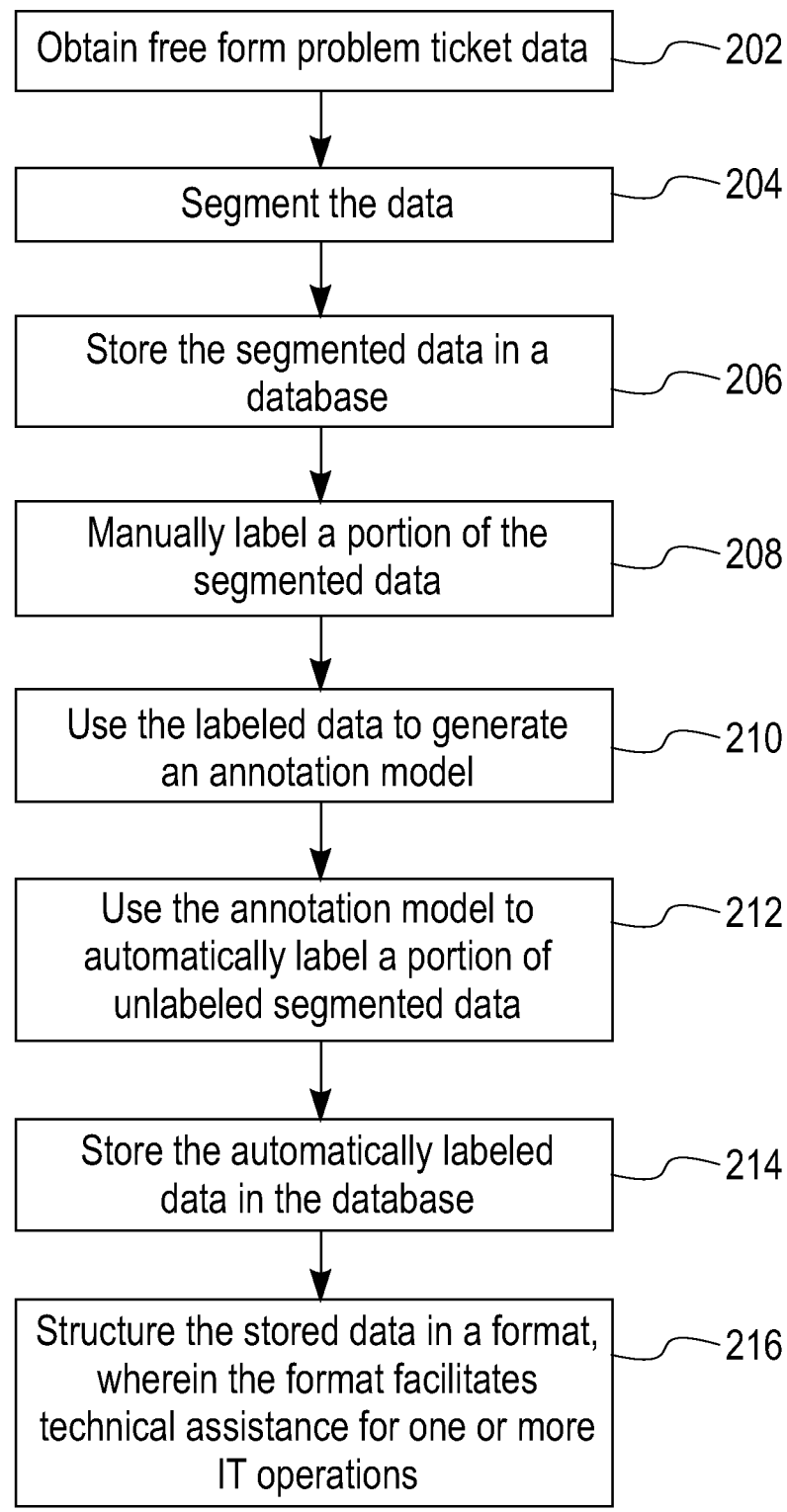
FIG. 2 is a flow diagram illustrating a method for automatically structuring free form problem ticket data for facilitating technical assistance for information technology (IT) operations, according to one embodiment of the invention.

FIG. 2 shows a flow diagram illustrating a method for automatically structuring free form problem ticket data for facilitating technical assistance for information technology (IT) operations, according to one embodiment of the invention. Step 202 includes obtaining free form problem ticket data. Step 204 includes segmenting the data. Step 206 includes storing the segmented data in a database. Step 208 includes manually labeling a portion of the segmented data. Exemplary labels may include, for example, abstract, blank line, contact information (info), important step, no data, problem context problem description, problem type, root cause, severity level, and unimportant step.

Also, step 210 includes using the labeled data to generate an annotation model. Generating an annotation model may include generating a semi-supervised learning process based on one or more machine learning techniques. An exemplary machine learning technique may include a conditional random fields (CRFs) learning technique. Step 212 includes using the annotation model to automatically label a portion of unlabeled segmented data. Step 214 includes storing the automatically labeled data in the database. Step 216 includes structuring the stored data in a format, wherein the format facilitates technical assistance for one or more IT operations. Technical assistance for an IT operation may include processing existing free form problem ticket data offline, and may also include processing newly obtained free form problem ticket data online.

A variety of techniques, utilizing dedicated hardware, general purpose processors, firmware, software, or a combination of the foregoing may be employed to implement one or more embodiments of the present invention. One or more embodiments of the invention can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

Figure 3:
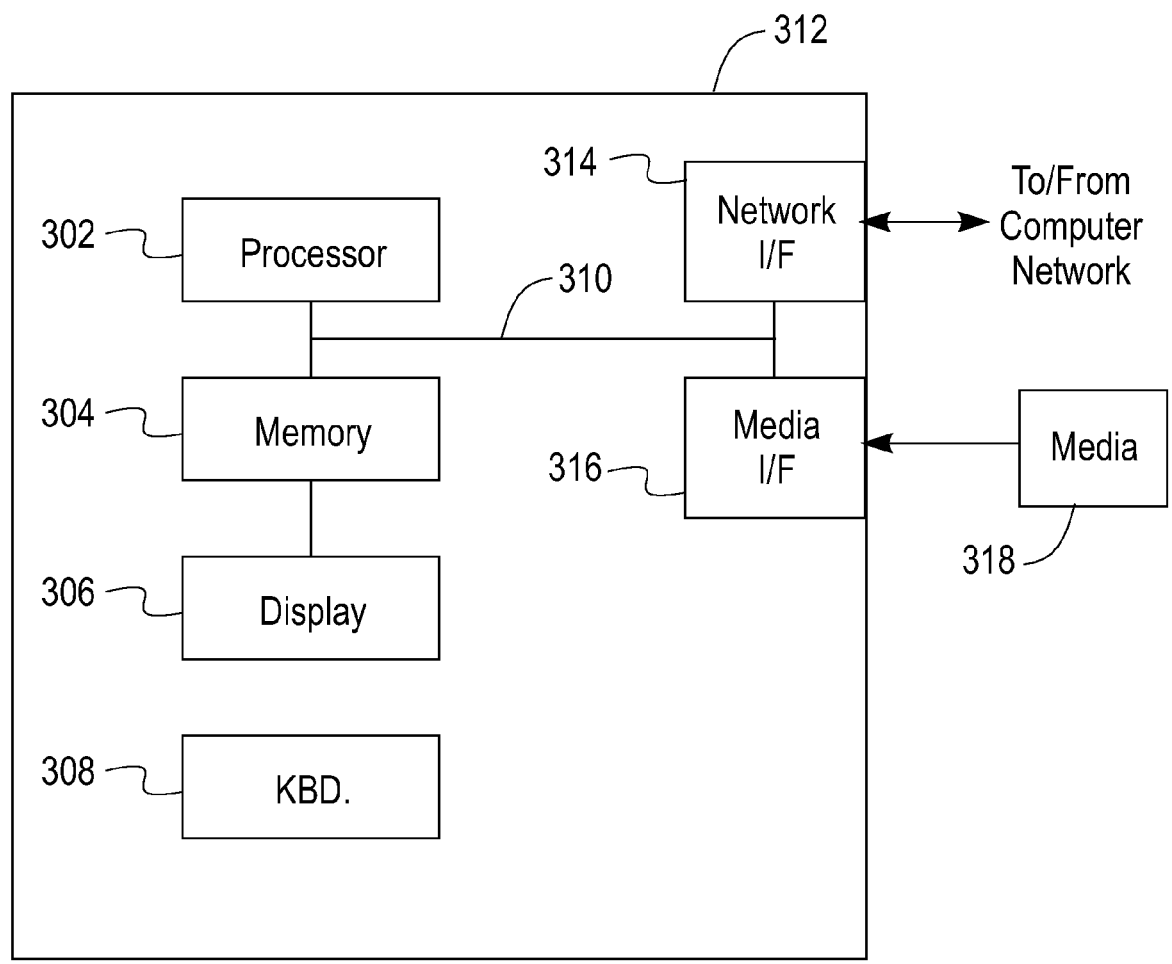
FIG. 3 is a system diagram of an exemplary computer system on which one or more embodiments of the present invention can be implemented.

One implementation of the present invention makes substantial use of software running on a general purpose computer or workstation. With reference to FIG. 3, such an implementation might employ, for example, a processor 302, a memory 304, and an input and/or output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 302, memory 304, and input and/or output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 318) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example memory 304), magnetic tape, a removable computer diskette (for example media 318), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 302 coupled directly or indirectly to memory elements 304 through a system bus 310. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem, wireless cards, and Ethernet cards are just a few of the currently available types of network adapters.

In any case, it should be understood that the components illustrated herein may be implemented in various forms of hardware, software, or combinations thereof for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Figure 4:
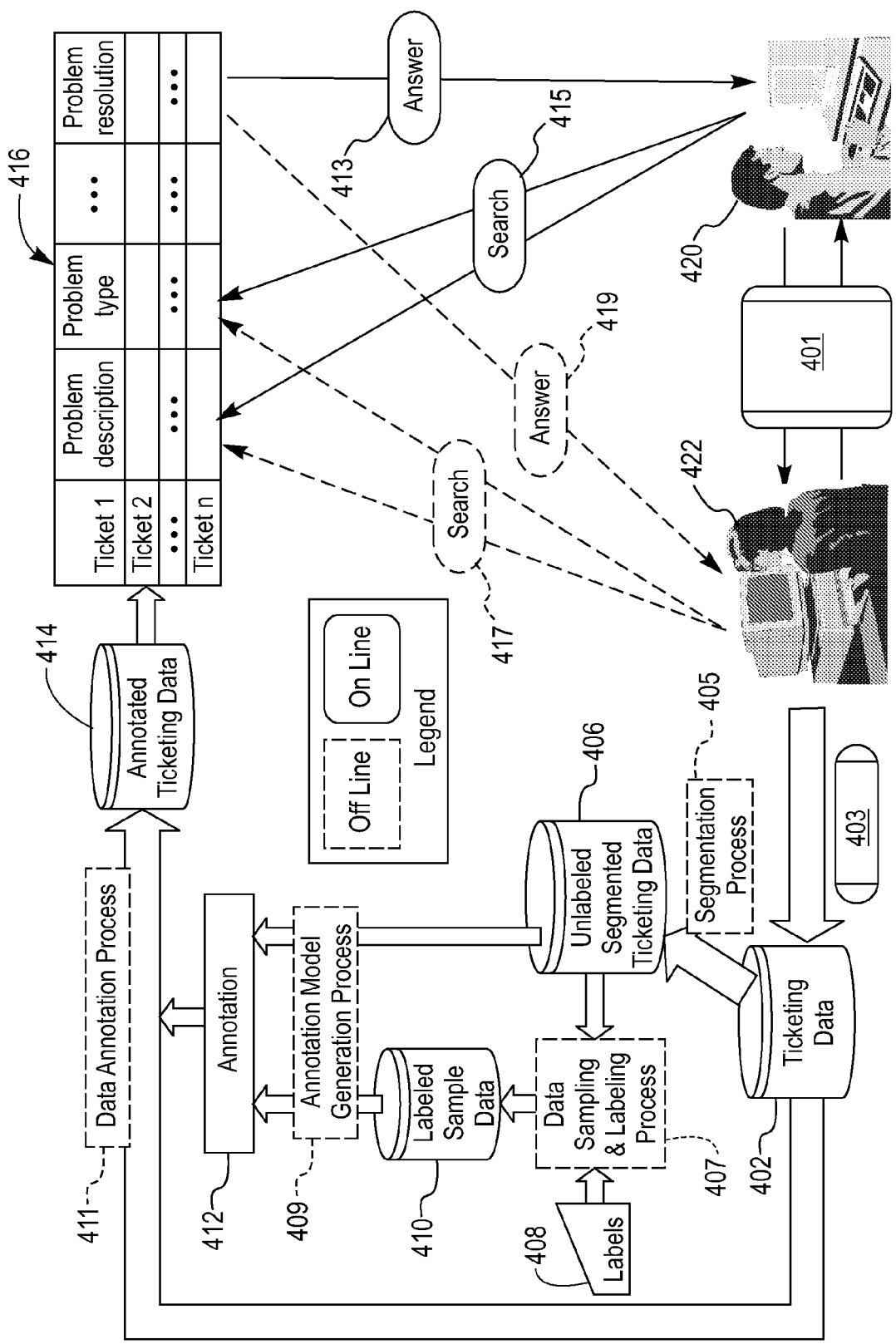
FIG. 4 is a diagram illustrating an exemplary system for automatically structuring free form problem ticket data for facilitating technical assistance for information technology (IT) operations, according to one embodiment of the invention.

FIG. 4 is a diagram illustrating an exemplary system for automatically structuring free form problem ticket data for facilitating technical assistance for information technology (IT) operations, according to one embodiment of the invention.

As illustrated in FIG. 4, there is an interaction 401 between a user 420 and a technical support individual 422 (for example, a remote technical assistance individual). A ticket is recorded by the technical support individual 422 at step 403 into a database, a collection of files, or a file 402 that stores the original ticketing data. Element 402 is a repository where the helpdesk personnel and the remote technical assistance individual record the actions taken during their investigation of a customer's issues.

The segmentation process in step 405 includes the data processing step that segments the free form ticketing data into units. Principles of the present invention may leverage different ways to achieve segmentation. For example, segmentation can be based on sentences by identifying the punctuation in the free form data. Also, segmentation can be based on identifying one or more line breaks in the data. Additionally, segmentation can be based on identifying parts of speech in the data. In an exemplary embodiment, segmentation can be based on identifying one or more verbs in the data.

The unlabeled segmented ticketing data generated by the segmenting process in step 405 is stored in a database, a collection of files, or a file represented by element 406. A randomly small portion of this data is handled during the data sampling and labeling process in step 407, a process which involves manual TT sampling and labeling. Potential exemplary labels 408 are described in Table 1 below.

TABLE 1

Description of potential labeling:

| Label | Label Description |
|---|---|
| Abstract | Lines related to the problem abstract. |
| Blankline | Lines that contain no visible text. |

TABLE 1-continued

Description of potential labeling:

| Label | Label Description |
|---|---|
| ContactInfo | Lines that contain remote assistant contact related records. |
| ImportantStep | Lines that contain the important resolution steps followed during the problem solving process. |
| Nodata | Lines of text that have no association with the problem, the resolution, or the call information. |
| ProblemContext | Lines of text containing any information related to the environment where the problem occurs and to the environment configuration. |
| ProblemDescription | Lines that describe the problem. |
| ProblemType | Lines of text that contain the categorization information of software and hardware problems. |
| RootCause | Lines containing diagnostic analysis of the problem. |
| SeverityLevel | Lines contain the severity level information that reflects the degree of emergency of the customer problem. |
| UnimportantStep | Lines describing steps unimportant from the problem resolution perspective, which the remote assistant may take such as, for example, "wait for customer feedback". |

Element 410 represents a database, a collection of files, or a file that stores the labeled sampled TT data generated by the data sampling and labeling process in step 407. Based on the manually labeled data stored in element 410, the annotation model generation process in step 409 trains the annotation model. In an exemplary embodiment of the present invention, the annotation model generation process in step 409 is a semi-supervised learning process based on machine learning techniques.

In a preferred embodiment of the invention, a recent machine learning technique, Conditional Random Fields (CRFs), is used because of its proven effectiveness on real-world tasks in various fields. As way of example and not limitation, $o=(o_1, o_2, \ldots o_T)$ can be a sequence of units of text in a ticket. Let S be a set of finite state machine (FSM) states, each of which is associated with a label, $l \in L$, such as, for example, <ProblemDescription>, <ImportantStep>, etc. Let $s=(s_1, s_2, \ldots s_T)$ be some sequence of states. CRFs define the conditional probability of a state sequence given an input sequence as:

$$P_\Lambda(s \mid o) = \frac{1}{Z_o} \exp\left(\sum_{t=1}^{T} \sum_{k} \lambda_k f_k(s_{t-1}, s_t, o, t)\right), \quad (1)$$

where $Z_o$ is a normalization factor over all state sequences, $f_k(s_{t-1}, s_t, o, t)$ is an arbitrary feature function over its arguments and $\lambda_k$ is a learned weight for each feature function.

In generating an exemplary model to be used to label data, a feature function may, for example, be defined to have the value "0" in most cases, and the value "1" if and only if $s_{t-1}$ is state #1 (for example, labeled <ProblemDescription>), $s_t$ is state #2 (for example, labeled <Error>), and the observation at position t in o is a line of text containing long strings separated by a couple of gaps. Higher λ weights make their corresponding FSM transitions more likely, so the weight $\lambda_k$ in this example should be positive since long strings often appear in lines of system error messages.

In the exemplary embodiment of the present invention which adopts Conditional Random Fields, the learning process' target is to evaluate $\lambda_k$. CRFs define the conditional probability of a label sequence based on total probability over the state sequences as follows:

$$p_\Lambda(l \mid o) = \sum_{g: l(s)=1} p_\Lambda(s \mid o), \quad (2)$$

where l(s) is the sequence of labels corresponding to the labels of the states in sequence s. The normalization factor (also known in statistical physics as the partition function) is the sum of the "scores" of all possible state sequences, as follows:

$$Z_o = \sum_{s \in S^T} \exp\left(\sum_{t=1}^{T} \sum_{k} \lambda_k f_k(s_{t-1}, s_t, o, t)\right)$$

The unlabeled TT data in element 406, other then the TT data sampled for populating element 409, can be used for advanced enhancing of the automatic-labeling model by semi-supervised learning techniques (for example, Blum, A., Mitchell, T. Combining labeled and unlabeled data with co-training. COLT: Proceedings of the Workshop on Computational Learning Theory, pages 92-100 (July 1998), as well as U.S. patent application identified as Ser. No. 11/675,396, filed concurrently herewith, and entitled "Method and Apparatus for Automatically Discovering Features in Free Form Heterogeneous Data," the disclosures of which are incorporated by reference herein).

An annotation model 412 is generated via the training process in step 409 from the labeled TT data in element 410. The annotation model 412 can be used to automatically determine the labels for the units of the remaining unlabeled TT data in element 406.

Element 414 represents a database, a collection of files, or a file that stores the automatically annotated TT data initially stored unlabeled in element 402 and transformed using the model in element 412. The automatic annotation process in step 411 can be executed, for example, offline, as illustrated in FIG. 4, by processing current existing data. It can also be done online by, for example, directly processing newly recorded TT data. Thus, when a technical individual (for example, a remote technical assistant) closes a ticket, the ticket can be automatically annotated based on the annotation model 412, and stored into element 414 with its labeled structure. In the latter exemplary embodiment, element 402 may store only the open tickets, that is, the tickets containing recording of problems still under investigation, while element 414 stores updated annotated TT data.

Element 416 is an example of structured TT data representation. As illustrated in FIG. 4, a structured TT data representation 416 may be a table in a relational database. The structured TT data representation may also be in the form of, for example, an extensible markup language (XML) format.

Once data is annotated, the structure associated with the labels allows the relevant TT data to be used in many applications. By way of example, such applications may include applications associated with providing remote technical support for IT products, such as, for example, hardware, software, network elements, etc. For instance, FIG. 4 illustrates how it can be used by a user 420 when a problem happens, to quickly look up a table 416 via step 415 to find out solutions in step 413 to similar problems encountered by other users. Helpdesk personnel 422 can also search element 416 via step 417 to reuse previously applied solutions. If there is a match, the resolution is known and conveyed to the helpdesk personnel 422 via step 419. If there is no match, the usual path of involving a call-taker can implemented by the helpdesk personnel 422. In one or more embodiments of the present invention, the user-delivered information has information related to the fields in element 416, such as, for example, problem type and problem description.

The structured TT data can also be used to discover the most frequently recurring problems, as well as to identify simple problems that may be resolved automatically. In an exemplary embodiment of the invention, such insights can be leveraged in the development of an automatic problem determination system by, for example, arranging each verb and the corresponding objects with an important-action label, and associating each verb with certain system operations.

One or more embodiments of the present invention can be implemented as a computer program, such as, for example, a computer program written in the Java or C programming language.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, performed on a data processing system comprising a memory and a data processor coupled to the memory, of automatically structuring free form heterogeneous data, the method comprising the steps of:
   obtaining free form heterogeneous data;
   segmenting the free form heterogeneous data into one or more units, wherein the one or more units includes a sentence;
   automatically labeling the one or more units based on one or more machine learning techniques, wherein each unit is associated with a label indicating an information structure type, wherein automatically labeling one or more units includes labeling a sentence with a label that indicates a type of information provided by the sentence; and
   structuring the one or more labeled units in a format to facilitate one or more operations that use at least a portion of the labeled units.

2. The method of claim 1, wherein the step of segmenting the free form heterogeneous data into one or more units comprises identifying punctuation in the free form data.

3. The method of claim 1, wherein the step of segmenting the free form heterogeneous data into one or more units comprises identifying one or more line breaks in the free form data.

4. The method of claim 1, wherein the step of segmenting the free foam heterogeneous data into one or more units comprises identifying a part of speech in the free form data.

5. The method of claim 4, wherein the part of speech is a verb.

6. The method of claim 1, wherein the step of structuring the one or more labeled units in a format comprises structuring the one or more labeled units in a table.

7. The method of claim 1, wherein the step of structuring the one or more labeled units in a format comprises structuring the one or more labeled units in an extensible markup language (XML) format.

8. The method of claim 1, wherein the one or more information technology operations comprises processing at least one of existing free form data and newly obtained free form data.

9. An apparatus for automatically structuring free form heterogeneous data, comprising:
   a memory; and
   at least one processor coupled to the memory and operative to:
   obtain free form heterogeneous data;
   segment the free form heterogeneous data into one or more units, wherein the one or more units includes a sentence;
   automatically label the one or more units based on one or more machine learning techniques, wherein each unit is associated with a label indicating an information structure type, wherein a sentence is automatically labeled with a label that indicates a type of information provided by the sentence; and
   structure the one or more labeled units in a format to facilitate one or more operations that use at least a portion of the labeled units.

10. The apparatus of claim 9, wherein the at least one processor is operative to segment the free form heterogeneous data into one or more units by identifying at least one of punctuation, one or more line breaks, and a part of speech in the free form data.

11. The apparatus of claim 9, wherein the at least one processor is operative to structure the one or more labeled units in a format to facilitate processing of at least one of existing free form data and newly obtained free form data.

12. A computer program product comprising a computer useable storage medium having computer useable program code for automatically structuring free form heterogeneous data, the computer program product including:
   computer useable program code for obtaining free form heterogeneous data;
   computer useable program code for segmenting the free form heterogeneous data into one or more units, wherein the one or more units includes a sentence;
   computer useable program code for automatically labeling the one or more units based on one or more machine learning techniques, wherein each unit is associated with a label indicating an information structure type, wherein automatically labeling one or more units includes labeling a sentence with a label that indicates a type of information provided by the sentence; and
   computer useable program code for structuring the one or more labeled units in a format to facilitate one or more operations that use at least a portion of the labeled units.

13. The computer program product of claim 12, wherein the computer usable program code for segmenting the free form heterogeneous data into one or more units comprises computer usable program code for identifying at least one of punctuation, one or more line breaks, and a part of speech in the free form data.

14. The computer program product of claim 12, wherein the computer usable program code for structuring the one or more labeled units in a format comprises computer usable program code for structuring the one or more labeled units in a format to facilitate processing of at least one of existing free foam data and newly obtained free form data.

* * * * *